United States Patent [19]

Ng et al.

[11] Patent Number: 5,493,322

[45] Date of Patent: Feb. 20, 1996

[54] ELECTROPHOTOGRAPHIC IMAGE FORMING APPARATUS WITH NON-UNIFORMITY CORRECTION OF RECORDING ELEMENTS

[75] Inventors: Yee S. Ng; Richard T. Fischer, both of Rochester, N.Y.

[73] Assignee: Eastman Kodak Company, Rochester, N.Y.

[21] Appl. No.: 41,092

[22] Filed: Apr. 1, 1993

[51] Int. Cl.⁶ ............................ G06F 15/00; B41J 2/435; H04N 1/407
[52] U.S. Cl. .................... 347/240; 358/298; 395/115
[58] Field of Search ................ 346/107 R; 358/298, 358/454, 458, 460, 461; 347/240, 183, 131, 15; 395/108, 115

[56] References Cited

U.S. PATENT DOCUMENTS

| | | | |
|---|---|---|---|
| 3,651,414 | 3/1972 | Jamieson | 377/44 |
| 4,394,662 | 7/1983 | Yoshida et al. | 358/298 X |
| 4,746,941 | 5/1988 | Pham et al. | 346/107 R X |
| 4,837,587 | 6/1989 | Ng | 346/108 |
| 4,963,989 | 10/1990 | Morton | 358/298 |
| 5,025,322 | 6/1991 | Ng | 358/298 |
| 5,111,217 | 5/1992 | Zeise | 346/107 R |
| 5,126,759 | 6/1992 | Small et al. | 346/107 R |
| 5,200,765 | 4/1993 | Tai | 346/107 R |

FOREIGN PATENT DOCUMENTS

WO91/10311 7/1991 WIPO.

OTHER PUBLICATIONS

IBM Technical Disclos. Bulletin vol. 12, No. 4, p. 614 (Sep. 1969), Johnson et al.

Primary Examiner—Benjamin R. Fuller
Assistant Examiner—David Yockey
Attorney, Agent, or Firm—Norman Rushefsky

[57] ABSTRACT

An electrophotographic printer uses plural recording elements such as LEDs for grey level recording. Redundant memory tables are provided that store redundant, but different, correction factors for correcting for nonuniformities of the LEDs at different grey levels. A nonlinear exposure clocking system is also provided for generating clock pulses at non-uniform intervals for use in controlling exposure durations for recording pixels. The clocking system includes a memory for storing binary signals that may be clocked out of a register and used as exposure clock pulses. The clock memory also includes redundant, but different, sets of possible clock pulses. As each new line of data is recorded, a signal is used to select one of the redundant sets of correction factors and a corresponding one of the redundant sets of exposure clock pulses. The use of this line-by-line change of exposure conditions tends to minimize production of image artifacts as errors in exposure by a particular LED are not continued from recording line to recording line.

6 Claims, 3 Drawing Sheets

ELECTROPHOTOGRAPHIC IMAGE FORMING APPARATUS WITH NON-UNIFORMITY CORRECTION OF RECORDING ELEMENTS

BACKGROUND OF THE INVENTION

1. Field of the Invention

The invention pertains to an image forming apparatus using an electrophotographic process and more particularly to an image forming apparatus for exposing an image carrying member by an LED (light emitting diode) array.

2. Description Relative to the Prior Art

Apparatus for selectively removing electric charge on an image-carrying member using LEDs in electrophotographic copiers or printers are well known.

In LED (light-emitting diode) electrophotographic copiers or printers, several thousand LEDs are typically arranged in one or more rows for recording on a suitable photoconductive web or drum. Driver circuitry are provided for selectively activating the LEDs to emit light to record in accordance with electronic data signals. In grey level LED printers such as disclosed in PCT Publication WO 91/10311 and U.S. application Ser. No. 07/498,512, now U.S. Pat. No. 5,200,765 (the contents of both of which are incorporated herein by this reference), the data signals may be multibit digital signals for determining an exposure duration for recording each pixel. As also noted in the aforementioned publication and application, the LEDs are known to be non-uniform light emitters relative to each other and correction is therefore desirable to overcome image degradation due to non-uniformities between the LEDs. One form of correction is adjustment of pulsewidth duration for recording each pixel so that any two LEDs on the printhead, when each is enabled to record a pixel of a desired density, will provide approximately identical densities, even though the light output (intensity) from each is very different. While the known correction methods may work well with printing of grey level halftone, it is not sufficient to handle more stringent requirements of printing continuous-tone images.

In correcting for non-uniformities a particular LED will have assigned thereto a number, N, of exposure times for exposing a corresponding number, N, of pixel sizes or density. As there are thousands of LEDs but only 255 available exposure times for say an eight-bits per pixel system, any correction thus represents for most LEDs an approximation. Thus, some LEDs will be provided with better correction than others. In recording of continuous tone images artifacts resulting from inadequate correction may be visible in the images and appear as thin lines in the in-track direction of recording. In addition to errors in LED non-uniformity correction, there are similar artifacts caused by improper placement of LEDs during assembly of the LEDs on the printhead. In assembly of the printheads, arrays of LED chips are positioned in a row. A row of LEDs on any one chip array will be uniformly spaced (pitched) apart at say 400 LEDs to the inch due to the accuracy of the manufacturing process of such chips. However, LEDs on the ends of adjacent chip arrays may not be positioned so as to be also spaced or pitched with this same spacing. It is desirable and therefore an object of the invention that the above-mentioned problems can be reduced.

SUMMARY OF THE INVENTION

These and other objects and advantages as will become apparent are realized by an image forming apparatus comprising an electrophotoconductive imaging member, a plurality of light-emitting units arranged in a row for recording a corresponding first row of pixels on the member; first means for energizing selected units to record individual pixels in said row, the first means energizing a selected one of said units to record a respective pixel in response to an exposure parameter determining signal and an exposure clocking signal; second means for generating the exposure parameter determining signal in response to both a signal having a factor relating to a grey level of a first pixel and a signal relating to a correction factor for correcting for non-uniformities of the one unit; third means for generating a set of exposure clocking signals for timing an exposure duration during recording of the first pixel; and fourth means responsive to a change in recording line for changing both the correction factor and a corresponding exposure clocking set for said unit for recording a successive pixel by said one unit wherein the exposure determining signals used for recording the successive pixel is determined by changing of the correction factor even though the factor related to grey level remains the same for said first and successive pixels.

In accordance with another aspect of the invention, there is provided an apparatus for supplying corrected image data signals to a printer having a plurality of recording units, each unit being energizable for recording a pixel on a recording medium, the apparatus comprising a first memory means for storing data representing exposure parameters for recording pixels of plural grey levels by at least one of said units, said data for each grey level and for said one unit including plural different selectable exposure determining parameters; a second memory means including a plurality of sets of exposure clocking data; and option selection means responsive to a new recording line for selecting one of the signals representing an exposure determining parameter and a corresponding one of the sets of exposure clocking data.

In accordance with still another aspect of the invention, there is provided an image forming method comprising the steps of generating data signals representing an image, at least a portion of which image includes a flat field; energizing selected light-emitting units to record a row of individual pixels on a recording medium, selected ones of said units being energized to record respective pixels in response to respective exposure parameter determining signals and a set of exposure clocking signals; generating the respective exposure parameter determining signals in response to both signals having factors relating to grey levels of the pixels and signals relating to respective correction factors for correcting for respective non-uniformities of the units; generating a set of exposure clocking signals for timing exposure durations; and in response to changes in recording lines, changing a set of respective correction factors for at least some of the units and a corresponding exposure clocking set associated with said set of correction factors and recording a successive row of pixel by said units to reduce artifacts in the portion of the image including the flat field.

DETAILED DESCRIPTION OF THE PREFERRED EMBODIMENTS

The apparatus of the preferred embodiment will be described in accordance with an electrophotographic recording medium. The invention, however, is not limited to apparatus for creating images on such a medium, as other media such as photographic film, thermal, etc. may also be used with the invention. The invention is also useful in recording with ink jet, electrographic, laser, etc.

Because electrophotographic reproduction apparatus are well known, the present description will be directed in particular to elements forming part of or cooperating more directly with the present invention. Apparatus not specifically shown or described herein are selectable from those known in the prior art.

Figure 1:
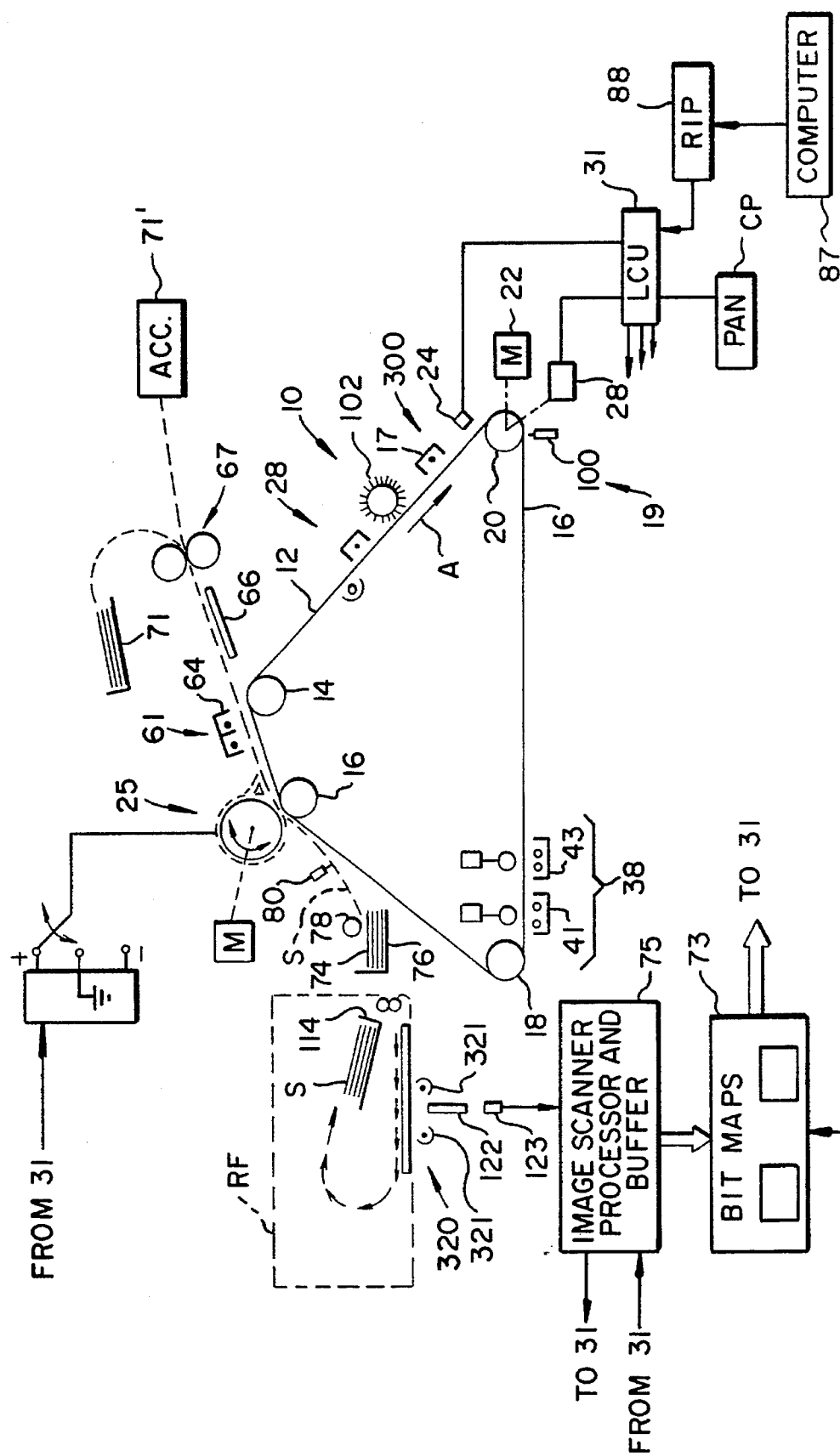
FIG. 1 is a schematic of a copier/printer forming one embodiment of apparatus of the invention.

With reference now to FIG. 1, an electrophotographic reproduction apparatus 10 includes a recording medium such as a photoconductive web 12 or other photosensitive medium that is trained about plural transport rollers 14, 16, 18 and 20, thereby forming an endless or continuous web. In lieu of a web, a drum recording medium may be used. Roller 20 is coupled to a driver motor M in a conventional manner. Motor M is connected to a source of potential when a switch (not shown) is closed by a logic and control unit (LCU) 31. When the switch is closed, the roller 20 is driven by the motor M and moves the web 12 in a clockwise direction as indicated by arrow A. This movement causes successive image area of the web 12 to sequentially pass a series of electrophotographic work stations of the reproduction apparatus.

For the purposes of the instant exposure, several work stations are shown along the web's path. These stations will be briefly described.

First, a charging station 300 is provided at which the photoconductive surface 16 of the web 12 is sensitized by applying to such surface a uniform electrostatic primary charge of a predetermined voltage. The output of the charger 17 may be controlled by a grid connected to a programmable power supply (not shown). The supply is in turn controlled by the LCU 31 to adjust the voltage level Vo applied onto the surface 16 by the charger 17.

At an exposure station 19 an electrostatic image is formed by modulating the primary charge on an image area of the surface 16 with selective energization of point-like radiation sources in accordance with signals provided by a suitable data source. In accordance with one embodiment of the invention, the information to be copied is formed on a multisheet document supported as a stack in a tray 114 that forms part of a recirculating feeder RF. In such a feeder the document sheets are fed seriatim from the bottom of the stack and are scanned by an image reading device 320 that includes lamps 321, gradient index lens array 122 and photosensors such as conventional photodiodes arranged as in a charge coupled device (CCD) array 123. The signals are processed by image scanner processor and buffer 75 and stored in a bit map memory storage array 73 so that the bit map now contains in digital signal format a bit mapped representation of the visible information on the original document sheets being copied. The point-like radiation sources are supported in a printhead 100 to be described in more detail below.

A development station 38 includes developer which may consist of iron carrier particles and electroscopic toner particles with an electrostatic charge opposite to that of the latent electrostatic image. Developer is brushed over the photoconductive surface 16 and toner particles adhere to the latent electrostatic image to form a visible toner particle, transferable image. The development station may be of the magnetic brush type with one or two rollers. Preferably, the toner particles may have a charge of the same polarity as that of the latent electrostatic image and develop the image in accordance with known reversal development techniques wherein the toner develops in areas discharged by energization of the point-like radiation sources. As shown, plural development stations 41, 43 may be provided for reproducing the image with two colors.

The apparatus 10 also includes a transfer station 25 shown with a corona transfer and detack chargers 61 at which the toner image on web 12 is transferred to a copy sheet S; and a cleaning station 28, at which the photoconductive surface 16 is cleaned of any residual toner particles remaining after the toner images have been transferred. After the transfer of the unfixed toner images to a copy sheet S, such sheet is transported to a heated pressure roller fuser 67 where the image is fixed to the copy sheet S and exited to a hopper 71 or finishing accessory 71'.

A copy sheet S is fed from a hopper supply 76 by driver roller 78, which then urges the sheet to move forward onto the web 12 in alignment with a toner image at the transfer station 25.

To coordinate operation of the various work stations 17, 19, 38, and 25 with movement of the image areas on the web 12 past these stations, the web has a plurality of indicia such as perforations along one of its edges. These perforations generally are spaced equidistantly along the edge of the web 12. At a fixed location along the path of web movement, there is provided suitable means 26 for sensing web perforations. This sensing produces input signals into the LCU 31 which has a digital computer, preferably a microprocessor. The microprocessor has a stored program responsive to the input signals for sequentially actuating, then deactuating the work stations as well as for controlling the operation of many other machine functions. Additional encoding means may be provided as known in the art for providing more precise timing signals for control of the various functions of the apparatus 10.

Programming of a number of commercially available microprocessors is a conventional skill well understood in the art. This disclosure is written to enable a programmer having ordinary skill in the art to produce an appropriate control program for the one or more microprocessors used in this apparatus. The particular details of any such program would, of course, depend on the architecture of the designated microprocessor.

The printhead 100 is provided with a multiplicity of energizable point-like radiation sources, preferably light-emitting diodes (LEDs). Optical means may be provided for focusing light from each of the LEDs onto the photoconductive surface 12. The optical means, for example, preferably comprises an array of optical fibers such as sold under the name SELFOC, a trademark for a gradient index lens array sold by Nippon Sheet Glass, Limited. Due to the focusing power of the optical means 29, a row of emitters will be imaged on a respective transverse line on the recording medium.

The printhead 100 further comprises a suitable support with a series of chips mounted thereon. Each of the chips includes in this example, say, 96 or 128 LEDs arranged in a single row. Chips are also arranged end-to-end in a row and where, for example, twenty-seven LED chips are so arranged, the printhead will extend across the width of the web 12 and include 2592 or 3456 LEDs arranged in a single row. To each side of this row of LEDs there are provided twenty-seven identical driver chips. Each of these driver chips include circuitry for addressing the logic associated with each of 48 or 64 LEDs to control whether or not an LED should be energized as well as to determine the level of current to each of the LEDs controlled by that driver chip 40. Two driver chips 40 are thus associated with each chip of 96 or 128 LEDs. Each of the two driver chips will be coupled for driving of alternate LEDs. Thus, one driver chip will drive the odd numbered LEDs of the 96 or 128 LEDs and the other will drive the even numbered LEDs of these 96 LEDs. The driver chips are electrically connected in parallel to a plurality of lines 34–37 providing various electrical control signals. These lines provide electrical energy for operating the various logic devices and current drivers in accordance with their voltage requirements. A series of lines provide clock signals and other pulses for controlling the movement of data to the LEDs in accordance with known techniques, see for example, U.S. Pat. No. 5,126,759, the contents of which are incorporated herein by reference.

Figure 2:
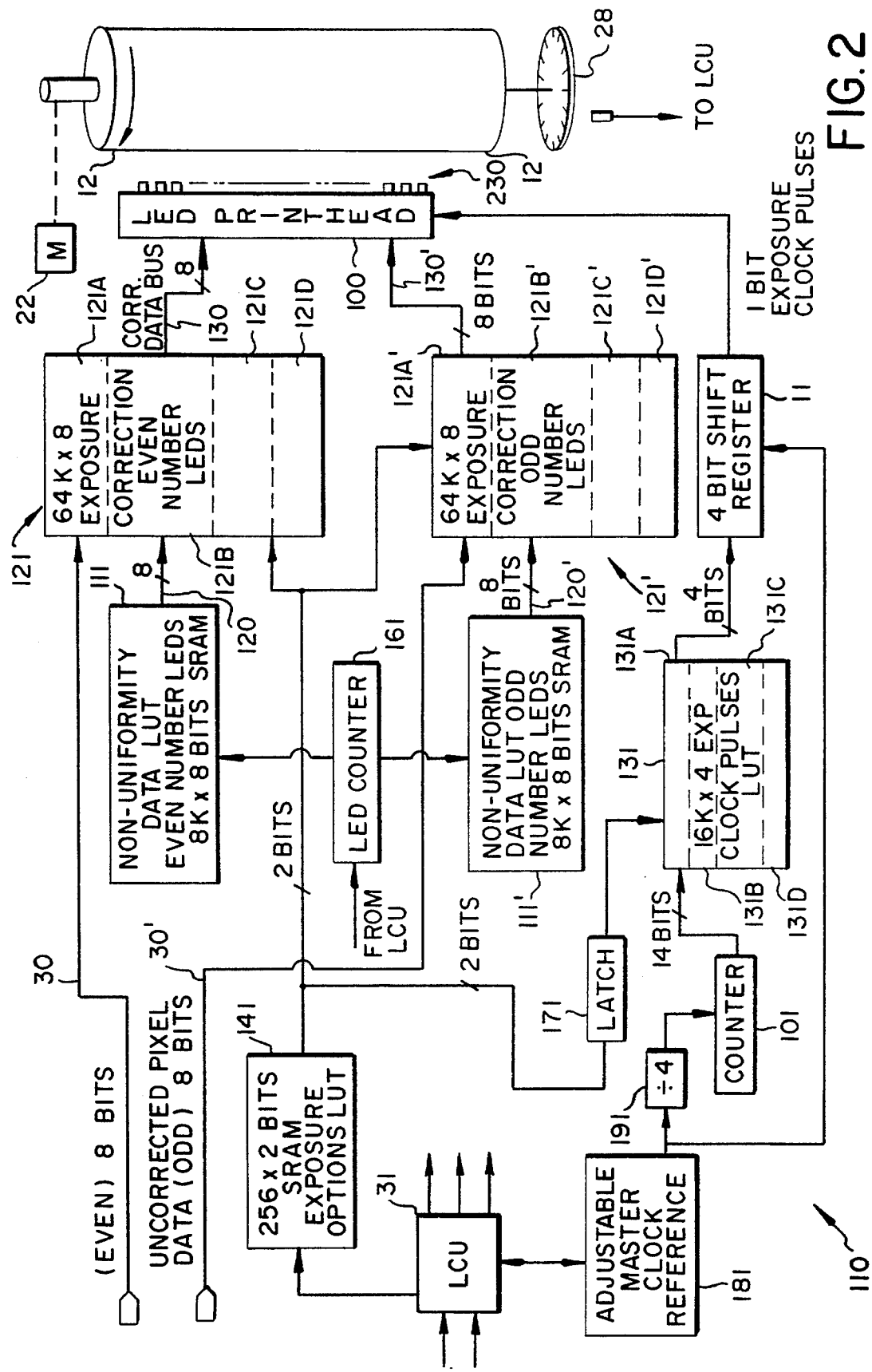
FIG. 2 is a schematic in block diagram form of controls used in the copier/printer apparatus of the invention.

With reference now being made to FIG. 2, a circuit 110 is provided to generate an eight-bit corrected grey level image data signal for transmission to the driver chips on printhead 100. In addition, the circuit 110 generates non-linear exposure clock pulses, see above-mentioned publication WO 91/10311, for controlling the duration of exposures by the LEDs. Assume in this example that the printhead 100 is a 400 dpi 8-bits per pixel LED printhead that is used to record on a recording medium such as the aforedescribed electrophotographic web 12. Of course, the web may be replaced by an electrophotographic drum. Printhead non-uniformity data is stored in an 8k×8 SRAM lookup table (LUT) memory LUT 111. There is one LUT set 111 for the even LEDs and another LUT set 111' for the odd LEDs. Four correction data lookup table memories 121 for the even and an additional four memories 121' for the odd use the respective outputs (8-bits) of the LUTs 111 and 111' as an input pointer. Each LUT 121, 121' may be a 64K×8-bit SRAM and may be subdivided into four tables LUT 121A, B, C or D and LUT 121A', 121B', 121C' or 121D'. LUTs 121, 121' contain the correction data for each grey level for their respective LEDs. In addition, there are four non-linear exposure clock LUTs 131 A, B, C or D each of which contains a 16K×4 data field for the exposure clock. That is, each of the LUTs 131A, B, C or D when selected provides the data for generating a different set of exposure clock pulses. The non-linear exposure clock LUT 131 is triggered by an exposure master clock 181 that can have a frequency that can be adjusted from 20 Mhz to 40 Mhz for process control purposes. However, as adjusted its function is to provide regular clock pulses at the particular frequency to which it is adjusted. The selection of which tables in LUT 121, 121' and LUT 131 are used is controlled by exposure options LUT 141 that contains 256×2 bits of data. The data output from LUT 141 controls which of the tables (131 A, B, C or D) of the exposure clock LUT 131 and which correction data tables (121A, B, C or D) of LUT 121 that are to be used in a particular data line for recording a row of pixels in the main scan (crosstrack) direction. These lines may be triggered from the position encoder 28 attached to the recording medium drive M.

In accordance with the invention, a random or more preferably changing correction scheme for recording is desired. Thus, signals to enable a changing selection of tables in LUTs 121, 121' and LUT 131 will be loaded into LUT 141. These signals comprise 256, 2-bit signals that are of random or preferably optimized order are arranged at successive addresses in the LUT 141. The invention proposes that change of the non-linear clocking signals and corresponding non-uniformity correction tables can be used to reach a better uniformity in a flat-field exposure area so that non-uniformities in the flat-field are minimized. Alternately, a random or other number generator may be used for generating a signal that is used to randomly or optimally change the particular tables selected in memories 121, 121' and 131. As the addresses in LUT 141 are successively addressed by the LCU 31 for each recording line of pixels a 2-bit signal is output to select one of the 4 tables of each of LUTs 131, 121 and 121'. An LED counter 161 under control of the logic and control unit 31 is also provided to identify the LED to which the current uncorrected pixel data pertains. The count value output from counter 161 and input to LUTs 111, 111' may identify both an odd and even LED since there are the same number of odd and even LEDs.

As noted above, the exposure clock LUT 131 comprises four different tables. Assume LUT 131A is selected in response to a two-bit selection signal from exposure options LUT 141 and which signal is stored in latch 171. Table 131A will include, for an eight-bit printhead, a string of at least 512 binary bits, i.e., 1's and 0's, that are output four bits at a time into shift register 11. This outputting is done in response to an address signal created by counter 101 that counts every fourth pulse from the master clock 181. A divide-by-four device 191 is connected to clock 181 and provides a pulse, for each series of 4-clock pulses, to increment the address output by counter 101. The bits are clocked out of the 4-bit shift register 11 in response to clock pulses from master clock 181. The clocked out signals from shift register 11 have rising edges that represent to the printhead clock pulses that are non-uniformly spaced in accordance with the original arrangement of 1's and 0's in memory 131A. The arrangement of 1's and 0's in each of memories 131A, B, C or D will be different to provide a different scheme of spacings between the generated rising edges to which the clocking circuitry is synchronized. For further details of such an exposure clock pulse generator, reference is made to U.S. application Ser. No. 07/807,522 and to IBM Technical Disclosure Bulletin, Vol. 12, No. 4, page 614 (September 1969), the contents of which are incorporated herein by this reference. Other exposure clock pulses generating circuits are known and also may be used such as disclosed in WO 91/10311, U.S. Pat. Nos. 5,111,217 and 5,025,322.

Figure 3:
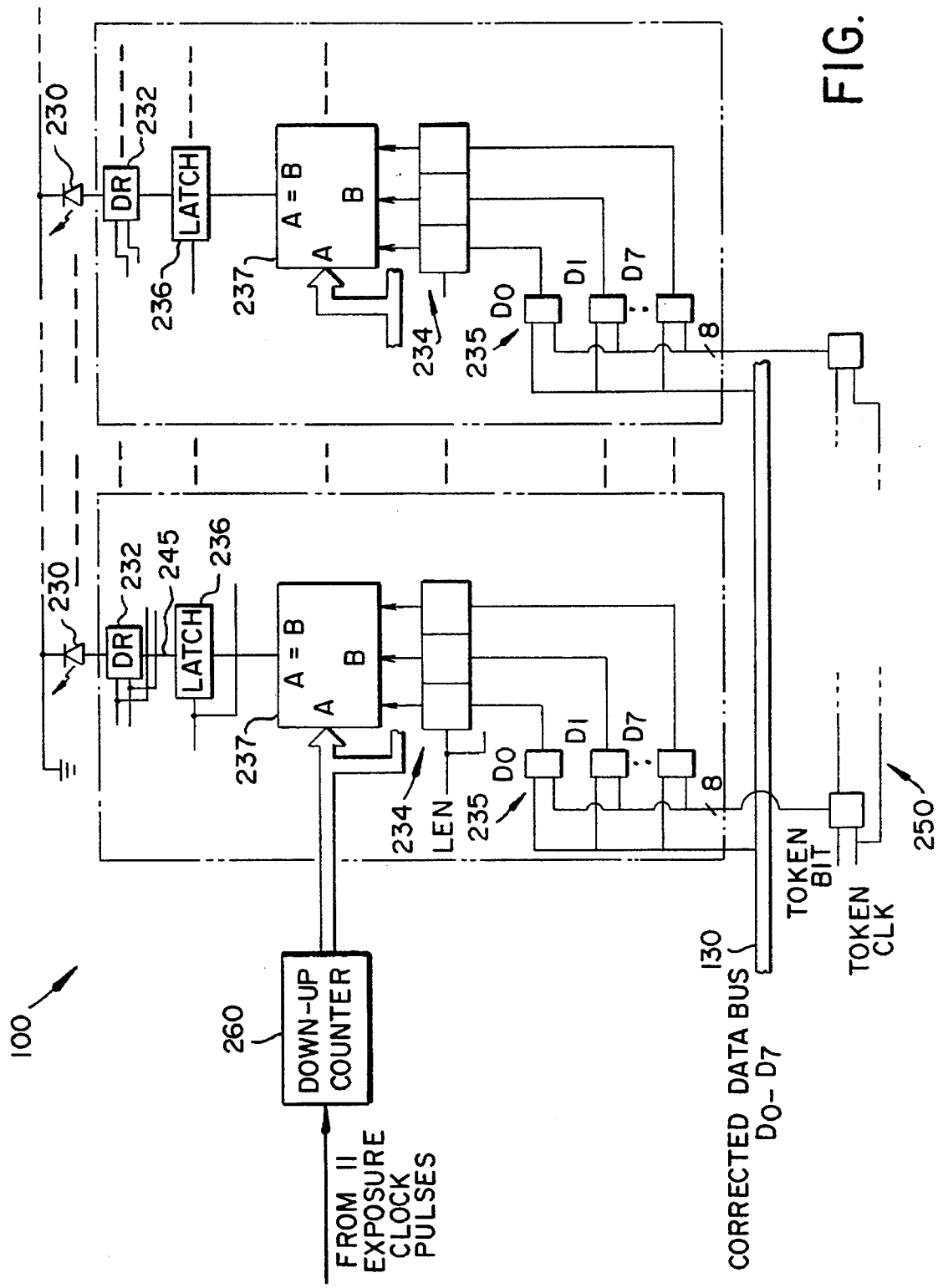
FIG. 3 is a schematic of a driver circuitry on a printhead forming a part of the copier/printer apparatus of the invention.

In operation, signals representing say 8-bits per pixel uncorrected image data are provided over each of data lines 30, 30' (even, odd, respectively). This data may originally have come from a scanner 320 or a computer 87 and raster image processor 88. This data has been processed to define pixel data of appropriate grey level for printing by the printhead at a particular pixel location. Thus lines 30, 30' each comprises a means for carrying grey level defining signals and the 8-bits per pixel uncorrected image data are represented by said signals and are grey level defining signals. In synchronization with this data, the LED counter 161 counts clock pulses from logic and control unit LCU 31. The signals output from the counter 161 represents a count identifying two particular LEDs (odd and even) that is associated with the respective uncorrected odd and even pixel data. The count from counter 161 is input as an address to respective LUTs 111, 111', each of which stores respective correction factors as correction signals relative to the respective odd and even LEDs. Typically, the data stored in such a LUT is empirically determined by measuring the individual light outputs of each of the LEDs and identifying LEDs having similar characteristics. The LEDs with such similar characteristics are identified as a group and provided with a correction factor that is stored in the respective LUTs 111, 111' and addressable by the count from counter 161. The outputted correction factors from LUTs 111, 111' are carried respectively by lines 120, 120'. Lines 120, 120' are connected respectively to LUTs 120, 121 and comprise means for carrying correction signals and the correction signals are used in conjunction with the uncorrected image data to define an address in exposure correction LUTs 121, 121'. LUTs 121, 121' each comprise four table memories 121A, B, C and D and 121A', B', C' and D' that are adapted to, in response to address inputs over lines 120, 120', provide on respective lines 130, 130' an exposure time-related corrected image data signal for recording a pixel of appropriate grey level to the respective LED to which the uncorrected image data pertains. With reference now to FIG. 3, the exposure-related corrected image data signals each comprises an exposure parameter determining signal and are transmitted to the printhead 100 over data bus 130 and latched by a data latch 234 on the printhead associated with each LED. In order to latch the eight-bit corrected data signals in registers 234, the data signals may be first latched off of bus 130 into registers 235 in response to a token bit signal that is shifted through a token bit register 250 in response to token clock pulses. Thus, as a token bit shifts through the token bit registers, a particular latch register 235 is enabled to latch the data currently on the data bus 130 and associated with the particular LED 230. In response to a subsequent latch enable (LEN) signal, data is shifted from respective latches 235 to latches 234. Exposure of the LED is controlled by comparing in a comparator 237 associated with each LED this multibit corrected image data signal stored in respective latch 234 with the output of a down-up counter 260 that is counting exposure clock pulses shifted out from register 11. The exposure clock pulses shifted out from register 11 comprise exposure clocking signals. The counter 260 is initially set with a count of 255 and counts down to zero and then back up to a count of 255. Thus, a pulsewidth modulated exposure duration is generated for each LED selected to be energized during a pixel main line recording period. A suitable current generated by driver current generating circuits 232 is driven through each LED selected to be energized to cause light outputs from the LEDs to be made for periods determined by the corrected data signals and the exposure clock pulses. A latch 236 ensures that current to an LED continues from the time them is a match between inputs A and B of comparator 237 during a down-count phase until there is no longer a match during an up-count phase of counter 260. The exposure duration for each recorded pixel will depend upon the corrected eight-bit image data signal and the exposure clocking scheme selected from LUT 131. The density of the pixel will vary depending upon the brightness characteristic of the LED and the exposure duration used for recording that pixel.

Considering exposure correction LUTs 121 and 121', it will be noted that them is also connected thereto as an address input a 2-bit signal from the 256 ×2 bits SRAM exposure options LUT 141. In response to signals from the LCU 31 for each pixel recording line, the output LUT of 141 either randomly changes or changed in a pattern that has been determined to provide either an optimum or a suitable reduction to the production of artifacts to thereby select one of the four correction data memories 121A, B, C or D in LUT 121, one of the four correction data memories 121A', B', C' or D' in LUT 121' and through latch 171, one of the four exposure clock memories 131A, B, C or D. It is desirable, however, that the selection of the particular exposure clock memory be associated with a particular correction data memory as empirically determined. The correction data in each of the correction memories 121A', B', C' and D' are different. A particular combination of correction data and set of exposure clock pulses will provide for a particular grey level for recording a pixel by a particular LED. Therefore, the data in the LUTs 121, 121' and 131 are determined so as to provide different combinations of exposure correction and exposure clocking. Consider an example where there are only two combinations of corrected exposure data and clock sets. One combination might provide, for example, an exposure for all the pixels on the cross-track line that is on average +5% of target while a different combination might be −5% of target on average. By alternately shifting combinations for each pixel recording line (also known as main scan recording period) over say 20 of these recording lines for one combination and 19 of these recording lines for the other combination the average non-uniformities can be reduced to 5%/19=0.26%. Thus, with the possible available combination and with optimized selection as determined empirically (via the exposure option LUTs 141 selection of which correction table and corresponding clock set to use for what line) for exposure, one can reduce the two dimensional non-uniformity and push the noise, i.e. artifacts, to a higher spatial frequency that is less visible to observers. Thus, one can even build a much more robust line or dot screen for the electrophotographic process simultaneously with grey level non-uniformity correction.

Note, too, that on one line an exposure for a particular LED might be more than 5% of optimum target even though its exposure is corrected but on the next line this LED's corrected exposure might be right on target so that through optimum selection of correction factors from line to line the likelihood for the production of artifacts is minimized.

Although the invention is described herein with pulse width modulation of exposure time, the invention is also applicable to adjusting of exposure intensity for recording pixels of different sizes or densities. In addition, in lieu of look-up tables a microprocessor or other rapid calculator may be used to calculate data otherwise stored in the disclosed tables.

The invention has been described in detail with particular reference to preferred embodiments thereof, but it will be understood that variations and modifications can be effected within the spirit and scope of the invention.

We claim:

1. An apparatus for supplying corrected image data signals to a printer having a plurality of recording units, each unit being energizable for recording a pixel on a recording medium, the apparatus comprising:

a first memory means for storing data representing exposure determining parameters for recording pixels of plural grey levels by at least one of said units, said data for each of said grey levels and for said at least one of said units including plural different selectable exposure determining parameters;

a second memory means for storing a plurality of sets of exposure clocking data;

means for generating a signal representing a new recording line; and option selection means responsive to said signal representing a new recording line for selecting one of the data representing an exposure determining parameter and a corresponding one of the sets of exposure clocking data;

and wherein said option selection means includes a memory storing data representing at least portions of address signals to said first memory means and said second memory means.

2. The apparatus of claim 1 and including means for inputting a signal relating to a grey level of a pixel as an address input to said first memory means.

3. The apparatus of claim 2 and wherein said second memory means stores plural series of binary signals, each series representing an independent exposure clock pulse generating scheme for use in recording a line of pixels by the printer.

4. The apparatus of claim 3 in combination with a printer having a plurality of said recording units.

5. The apparatus of claim 4 and wherein said recording units are light-emitting units.

6. The apparatus of claim 5 and wherein said recording medium is an electrophotoconductive recording medium.

* * * * *